(12) United States Patent
Kaminski

(10) Patent No.: US 9,971,328 B2
(45) Date of Patent: May 15, 2018

(54) FLOW CONTROL CENTER SENSING PRESSURE BY BAROMETRIC SENSOR AND EMIT SENSED PRESSURE SIGNAL

(71) Applicant: Michael Anthony Kaminski, Ste. Anne (CA)

(72) Inventor: Michael Anthony Kaminski, Ste. Anne (CA)

( * ) Notice: Subject to any disclaimer, the term of this patent is extended or adjusted under 35 U.S.C. 154(b) by 262 days.

(21) Appl. No.: 15/008,348

(22) Filed: Jan. 27, 2016

(65) Prior Publication Data
US 2017/0208755 A1    Jul. 27, 2017

(51) Int. Cl.
*A01G 25/16*    (2006.01)
*G05B 19/042*    (2006.01)
*G05D 7/06*    (2006.01)
*F16K 37/00*    (2006.01)

(52) U.S. Cl.
CPC ......... *G05B 19/042* (2013.01); *A01G 25/167* (2013.01); *A01G 25/162* (2013.01); *F16K 37/005* (2013.01); *F16K 37/0041* (2013.01); *G05B 2219/2625* (2013.01); *G05D 7/0623* (2013.01)

(58) Field of Classification Search
CPC .... A01G 25/16; A01G 25/167; G05B 19/042; G05B 2219/2625
See application file for complete search history.

(56) References Cited

U.S. PATENT DOCUMENTS

| 5,033,397 | A | 7/1991 | Colburn, Jr. |
| 5,445,178 | A | 8/1995 | Feuer |
| 5,574,657 | A * | 11/1996 | Tofte ..................... A01C 23/007 700/240 |
| 6,164,116 | A * | 12/2000 | Rice ..................... G01M 3/2876 73/1.72 |
| 6,484,652 | B1 | 11/2002 | Colburn, Jr. |
| 7,927,883 | B2 | 4/2011 | Tuli et al. |
| 8,104,498 | B2 | 1/2012 | Dresselhaus et al. |
| 8,354,852 | B1 | 1/2013 | Campbell et al. |
| 8,361,186 | B1 | 1/2013 | Shearer et al. |
| 8,558,044 | B2 | 10/2013 | Smaidris |
| 8,606,415 | B1 * | 12/2013 | Woytowitz ........... A01G 25/167 239/69 |
| 8,649,907 | B2 * | 2/2014 | Ersavas ................... A01G 1/00 700/275 |
| 8,924,032 | B2 | 12/2014 | Woytowitz et al. |

(Continued)

FOREIGN PATENT DOCUMENTS

| CA | 1072441 A | 2/1980 |
| EP | 1431856 A1 | 6/2004 |

*Primary Examiner* — Ramesh Patel

(57) ABSTRACT

A flow control center can include a barometric sensor, at least one ball valve assembly, and a computing device. The ball valve can be controllable among a plurality of discreet positions to selectively change a flow of fluid. The computing device can have a communication device configured to receive signals from the barometric sensor. The computing device can determine a first flow rate in response to the sensed pressure represented by the first signal. The computing device can also control a motor of the ball valve assembly to move a ball valve to a first of the plurality of discreet angular positions. The first of the plurality of discreet angular positions can correspond to the sensed pressure represented by the first signal.

18 Claims, 7 Drawing Sheets

(56) References Cited

U.S. PATENT DOCUMENTS

| | | | |
|---|---|---|---|
| 2003/0088338 A1* | 5/2003 | Phillips | B67D 1/1204 700/282 |
| 2010/0299122 A1* | 11/2010 | Golinveaux | G05B 17/02 703/9 |
| 2011/0035059 A1* | 2/2011 | Ersavas | A01G 1/00 700/276 |
| 2011/0179703 A1 | 7/2011 | Gupta et al. | |
| 2014/0110498 A1* | 4/2014 | Nelson | A01G 25/092 239/69 |
| 2014/0277764 A1* | 9/2014 | Burt | G05B 15/02 700/276 |
| 2015/0129673 A1* | 5/2015 | Klinefelter | B05B 12/02 239/7 |

* cited by examiner

FLOW CONTROL CENTER SENSING PRESSURE BY BAROMETRIC SENSOR AND EMIT SENSED PRESSURE SIGNAL

BACKGROUND

1. Field

The present disclosure relates to residential and commercial irrigation systems and more particularly to systems that can be remotely actuated.

2. Description of Related Prior Art

U.S. Pat. No. 8,924,032 discloses an IRRIGATION SYSTEM WITH EVAPOTRANSPIRATION (ET) BASED SEASONAL WATERING ADJUSTMENT AND SOIL MOISTURE SENSOR SHUTOFF. The irrigation system includes at least one environmental sensor, such as a solar radiation sensor that is installed on an irrigation site, and a soil moisture sensor that is also installed on the irrigation site. Programming allows an estimated ET value to be calculated based at least in part on the output signal of the environmental sensor. A pre-programmed watering schedule is automatically modified based on the estimated ET value to thereby conserve water while maintaining the health of plants on the irrigation site. The system automatically inhibits irrigation when an output signal of the soil moisture sensor indicates an amount of moisture in the soil is above a predetermined threshold.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A flow control center can include a barometric sensor, at least one ball valve assembly, and a computing device. The barometric sensor can be configured to sense pressure and emit a first signal corresponding to sensed pressure. The at least one ball valve assembly can have a body, a ball valve positioned in the body, a motor engaged with the ball valve. The motor can be configured to move the ball valve among a plurality of discreet angular positions to selectively change a flow of fluid through the valve assembly. The plurality of discreet angular positions can include a first position in which the ball valve closes the body and a second position in which the ball valve minimally blocks the body. The computing device can have a communication device configured to receive the first signal from the barometric sensor. The computing device can also have one or more processors and a non-transitory, computer readable medium storing instructions. Upon execution of the instructions by the one or more processors, the computing device can receive the first signal from the sensor. The computing device can also determine a first flow rate in response to the sensed pressure represented by the first signal. The computing device can also control the motor to move the ball valve to a first of the plurality of discreet angular positions. The first of the plurality of discreet angular positions can correspond to the sensed pressure represented by the first signal.

BRIEF DESCRIPTION OF THE DRAWINGS

The detailed description set forth below references the following drawings.

DETAILED DESCRIPTION

Figure 1:
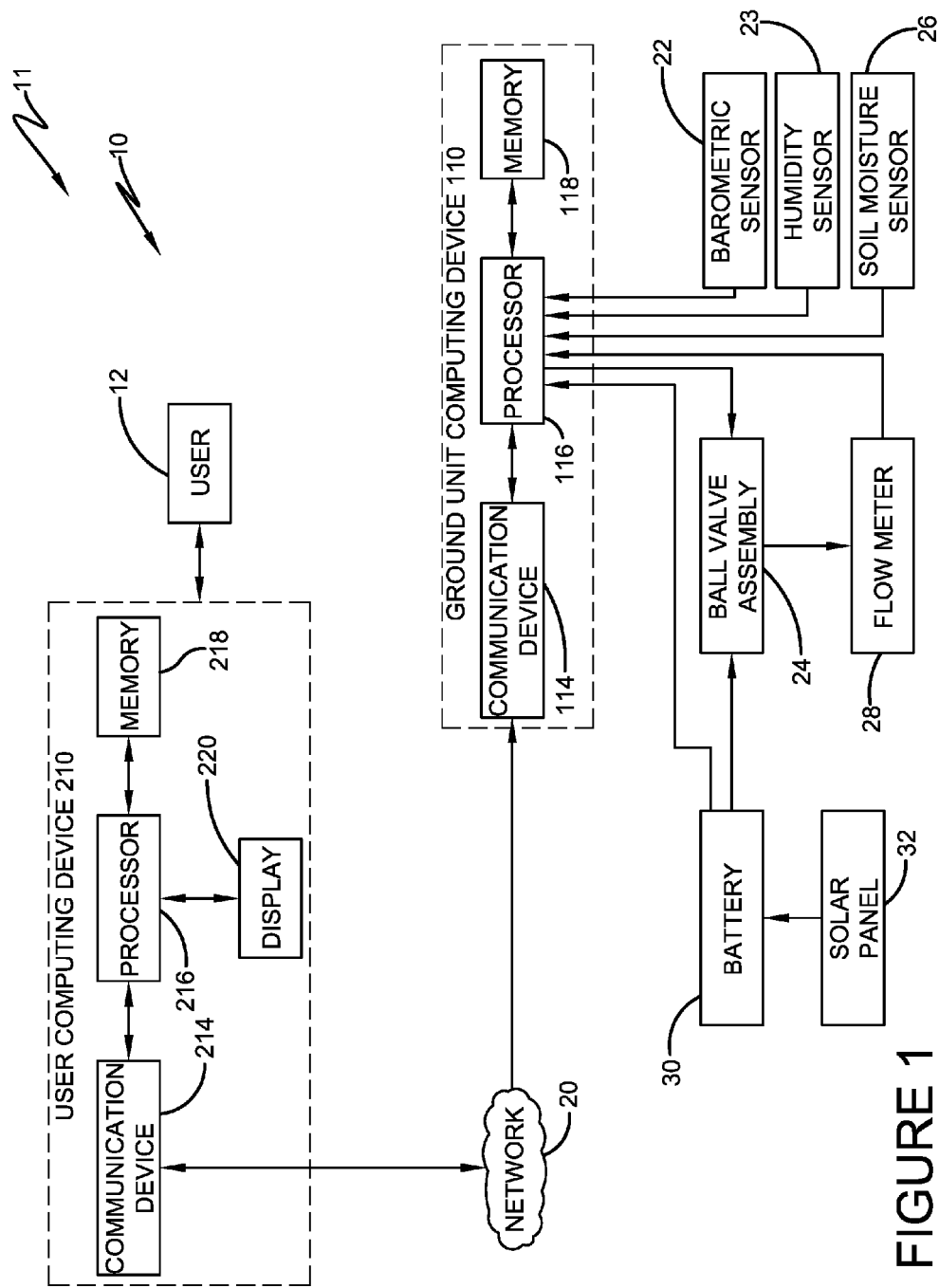
FIG. 1 is a functional block diagram of an exemplary flow control center according to some implementations of the present disclosure.

Water waste can occur when watering fields, gardens, lawns, and flower beds. The present disclosure, as demonstrated by the exemplary embodiment described below, can reduce water waste by fifty percent by controlling, calibrating, and programming the water flow rate, resulting in proper use of the correct amount of water required for the foliage at hand. The present disclosure, as demonstrated by the exemplary embodiment described below, can be available at all times and from all locations to water plant life, such as at a primary home or at a cottage. The present disclosure, as demonstrated by the exemplary embodiment described below, can provide a multi-functional programmable computer application ("app") that operates from a mobile device and dictates a series of commands to a motorized valve.

One or more implementations of the present disclosure can be configured to include a digitally programmable, motorized valve that is installed in fluid communication with a main water supply and allows water to flow through its body in the full open position or one of a plurality of discrete partially-open positions. The motorized valve can be programmable with its available functions and features. The available functions and features can include: (1) the ability to manually set up the exact time frames when the user decides the water should be on or off depending on the local weather conditions at the time wherein timer settings can set up for any day of the week, using selected dates on the user's mobile devices calendar; (2) pre-programmed watering times can be selected using settings that are also available on this timer function, allowing the user to choose from any one of them to suit their watering needs which can be very beneficial and convenient when the user is away for long periods of time, or preoccupied with other events; (3) a humidity feature that allows the user to control the on or off water functions of the motorized valve by manually choosing from a selection of icons depicting a series of humidity readings, wherein the user would choose from the correct matching readings [i.e. 20%-50%] according to the local humidity conditions available from a source of weather information such as a web site, turning on the water at the motorized valve until it is manually shut off at the on or off feature or automatically turned off when the appropriate humidity conditions existed, this feature is especially handy when the weather conditions are unstable; (4) a barometric feature with a series of animated icons [i.e. sunny, mainly sunny, partly cloudy, cloudy] that can be manually set by choosing the appropriate icon on the screen, in accordance to the local weather conditions to turn the water on or off wherein water can be released for only a set time, depending on how the time intervals are set up in accordance with the available animated weather icons; (5) automatic alerts and notifications sent to the user suggesting that water be turned on or off; (6) a sourced weather feature allowing the user to enjoy the benefits of completely automated operation depending on local weather conditions to turn the water on or off; (7) a moisture content feature allowing the user to monitor the soils moisture level at all times; and (8) a flow meter function allowing the user to keep track by gallons per minute of how much water is actually put to good use in their growing, and maintenance endeavors.

One or more embodiments of the present disclosure can be a WI-FI enabled motorized, quarter-turn, full-port ball valve with a built in flow rate sensor and a fluid-flow, resettable calibrator device couple in working synchronicity with a WI-FI enabled humidity/barometric pressure/soil and media moisture sensor. The valve can be controlled with an app. The sensor can communicate data with the app.

The motorized, WI-FI enabled motorized, quarter-turn, full-port ball valve and the flow rate sensor\calibrator can work effectively as one, controlling and monitoring the gallons per minute (GPM) or liters per minute (LPM). The valve and sensor can effectively operate as one with the WI-FI enabled humidity/barometric pressure/soil and media moisture sensor. The ball mechanism of the valve itself will under designated commands, turn spherically from left to right, or right to left (fully open to fully closed). A sequence of all other working positions are also programmable to meet a wide variety of selected flow requirements. Its functional abilities set forth herein will control the flow rate of any fluid in motion. It can also monitor and calibrate fluid flow rate by calculating in GPM or LPM as fluid passes by a paddle flow rate mechanism, integrated into the outlet side of the ball valve. Through use of the app, the operator compatible communication device, will be totally engaged with an available Application Programming Interface (API). Under designated programmed requests, the API can issue out demands of operation to the torque rated stepper motor of the Ball valve, a 120 vac transformed to 12 or 24 vdc power. The motor also will operate from an optional integrated power supply consisting of a 12 or 24 volt rechargeable lithium ion battery, completely rechargeable from an integrated onboard 12 to 24 vdc 1 Hour charging system that utilizes 120 vac for a power supply. In addition, a compatible solar panel will supply complete continuous power to the 12 or 24 volt battery in the event of a power outage or blackout. The programmable motor will rotate the ball valve to its requested position until other positions are in demand by the operator (user).

The WI-FI enabled relative humidity\barometric pressure\soil and media moisture sensor data collection receiver can also gather required weather, pressure, humidity, and soil moisture level data and then send the pertinent information to the processor, which then directs it to a communication device. The collected data is utilized through the settings of the app to analyze and determine the proper method for controlled movement, by determining the correct positioning of the ball valve for it designated time frame of operation (open, closed, or partially open). The amount of fluid-flow, within a series of time frames, is also programmable with the app. Data from the weather channel can also be synced into the programming of a system according to one or more implementations of the present disclosure for full automation. The power supply for the weather receiver can consist of two 1.5 vdc lithium ion rechargeable batteries that charge completely as required during daylight hours.

One or more implementations of a flow control center 11 according to the present disclosure can include a computing device 10, a barometric sensor 22, a humidity sensor 23, and a ball valve assembly 24. The barometric sensor 22 can be configured to sense pressure and emit a first signal corresponding to sensed pressure; the signal can be received by the computing device 10. The humidity sensor 23 can be configured to sense a level of humidity in the air and emit a signal corresponding to sensed humidity; the signal can be received by the computing device 10. Referring now to FIG. 1, a functional block diagram of one example computing device 10 is illustrated. The example computing device 10 can include a ground unit computing device 110 and a user computing device 210. Similar features in a particular embodiment have been numbered with a common two-digit, base reference numeral and have been differentiated by a different leading numeral. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The exemplary ground computing device 110 can be operated by a user 12 through the exemplary user computing device 210. The exemplary user computing device 210 can be a mobile computing device. In other implementations of the present disclosure, a computing device 10 can only include a ground unit computing device 110 and the ground unit computing device 110 can be directly controlled by the user 12. It should be appreciated that a computing device according to one or more implementations of the present disclosure can be cooperatively defined by structures that are physically remote from one another, such, for example, a server and smartphone. Examples of computing devices include desktop computers, laptop computers, tablet computers, mobile phones, and smart televisions. In some embodiments, the computing device 10 can include a server, wherein input from the user 12 is received by the computing device 10 from another computing device associated with the user 12.

The ground unit computing device 110 can include a communication device 114, a processor 116, and a memory 118. The user computing device 210 can include a communication device 214, a processor 216, a memory 218, and a display 220. The display 220 can be a touch-screen display. The ground unit computing device 110 can be physically proximate to and communicate with soil moisture sensor 26 and a flow meter 28. The soil moisture sensor 26 can be configured to sense a level of moisture in soil and emit a third signal corresponding to sensed level of moisture in soil. The flow meter 28 can detect a flow rate of fluid through the ball valve assembly 24. The flow meter 28 can be configured to sense a rate of fluid flow through the body and emit a second signal corresponding to sensed rate of fluid flow. A battery 30 can provide power to the processor 16 and the ball valve assembly 24. The battery 30 can receive electrical current/power from a solar panel 32. The solar panel 32 can be configured to generate electric current and be in electrical communication with the battery 30 to deliver the electrical current to recharge the battery 30.

The communication devices 114, 214 can be configured for communication between the respective processors 116, 216 and other devices, via a network 20. The communication device 114 configured to receive the first signal from the barometric sensor 22. The network 20 can include a local area network (LAN), a wide area network (WAN), e.g., the Internet, or a combination thereof. The communication devices 114, 214 can include any suitable communication components, such as a transceiver. Specifically, the communication devices 114, 214 can transmit requests for input to the user 12 from the processor 116, can provide response(s) to these requests to the processor 116, and can transmit commands from the user 12 over the network 20 to the processor 116. The memory 118, 218 can be configured to store information at the respective computing devices 110, 210 such as watering schedules, flow rate calibration algorithms, water volume usage history, water zone maps, and alert conditions. Watering schedules can define when water should be released by the flow control center 11. Flow rate calibration algorithms can define a process by which the flow control center 11 can assess a level of moisture in the soil after water has been released. Water volume usage history can track and sum water usage over a particular period and/or throughout the entire operational life of the flow control center 11. Water zone maps can define sub-areas for watering when the flow control center 11 includes a plurality of ball valve assemblies. Alert conditions can define when the flow control center 11 changes a water release schedule set by the user 12 and/or when the flow control center 11 outputs a message to the user 12 in response to predetermined events, such as heavy rain. The memory 18 can be any suitable storage medium (flash, hard disk, etc.).

The processors 116, 216 can be configured to control operation of the computing device 10. It should be appreciated that the term "processor" as used herein can refer to both a single processor and two or more processors operating in a parallel or distributed architecture. The processors 116, 216 can operate under the control of an operating system, kernel and/or firmware and can execute or otherwise rely upon various computer software applications, components, programs, objects, modules, data structures, etc. Moreover, various applications, components, programs, objects, modules, etc. may also execute on one or more processors in another computing device coupled to processors 116, 216, e.g., in a distributed or client-server computing environment, whereby the processing required to implement the functions of embodiments of the present disclosure may be allocated to multiple computers over the network 20. The processors 116, 216 can be configured to perform general functions including, but not limited to, loading/executing an operating system of the computing device 10, controlling communication via the communication devices 114, 214 and controlling read/write operations at the memory 118, 218. The processors 116, 216 can also be configured to perform specific functions relating to at least a portion of the present disclosure including, but not limited to, loading/executing a flow control center computer application (app) and one or more other applications at the computing device 10, initiating/controlling the outputting of a user interface to the user 12 through the control of the display 20, including creating and modifying the user interface, which is described in greater detail below.

Memory 118, 218 can be defined in various ways in implementations of the present disclosure. Memory 118, 218 can include computer readable storage media and communication media. Memory 118, 218 can be non-transitory in nature, and may include volatile and non-volatile, and removable and non-removable media implemented in any method or technology for storage of information, such as computer-readable instructions, data structures, program modules or other data. Memory 118, 218 can further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the controllers 116, 216. Memory 118, 218 can store computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

It is noted that in one or more implementations of the present disclosure, a computing device can only include a ground computing device. In such an embodiment, the ground computing device can include at least one peripheral allowing the user 12 to input commands and/or extract data.

Figure 2:
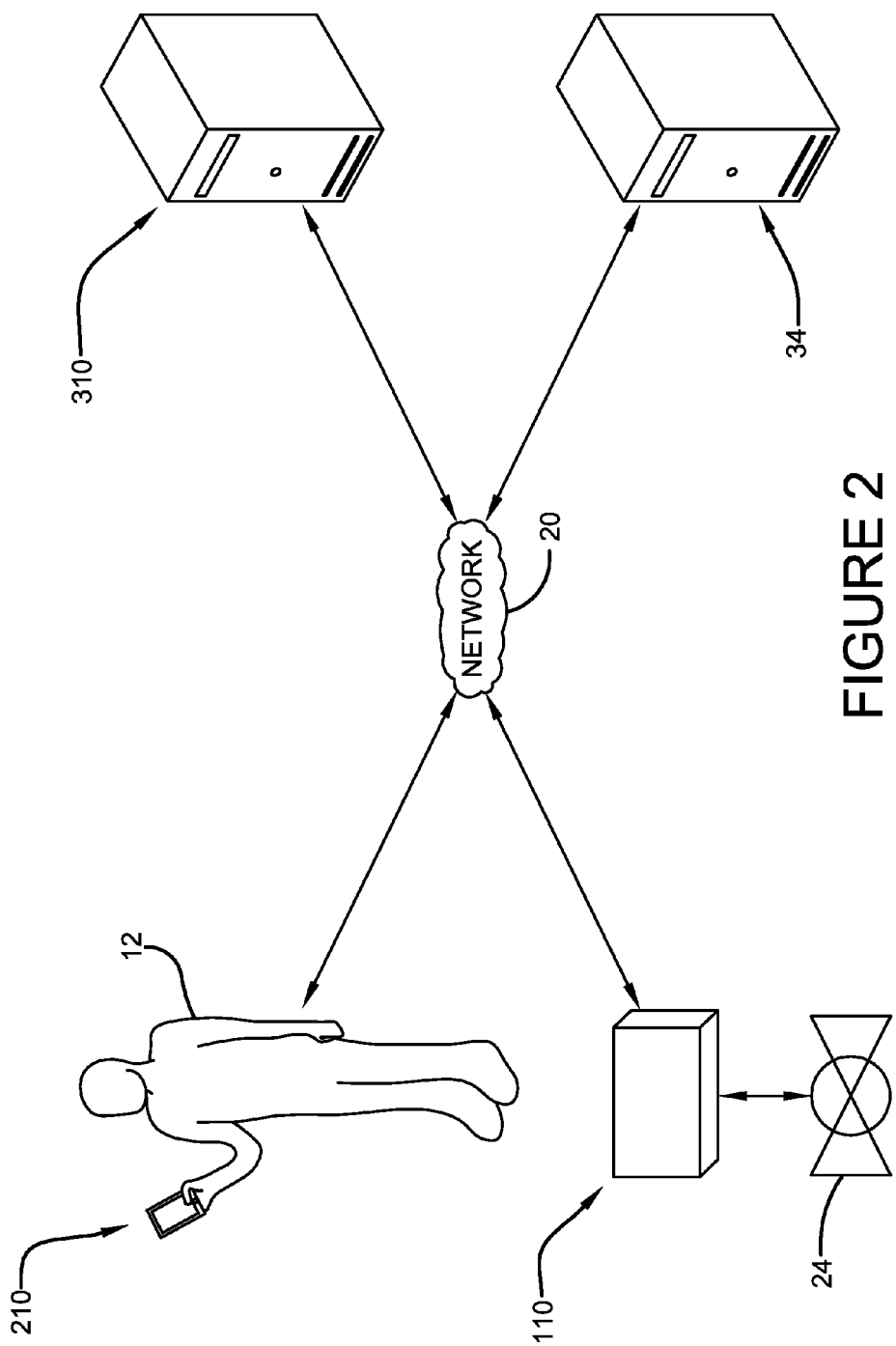
FIG. 2 is a diagram of a computing system including an exemplary flow control center according to some implementations of the present disclosure.

FIG. 2 is a diagram of a computing system including an exemplary flow control center according to some implementations of the present disclosure. The ground computing device 110 and the user computing device 210 are shown in communication with one another over the network 20. The user 12 and the ground computing device 110 can be physically remote from one another. The exemplary computing device 10 can also include a server computing device 310. In this embodiment, the server computing device 310 can be utilized to store preferences of the user 12, historical weather data, historical water usage data of the user 12, and any other data that be beneficial to an implementation of the present disclosure. The server computing device 310 can be utilized to execute complex (resource intensive) processing on behalf of the ground computing device 110 and the user computing device 210. System updates can also be initiated at the server computing device 310. The ground computing device 110, the user computing device 210, and the server computing device 310 can operate cooperatively and define an embodiment of computing device for one or more implementations of the present disclosure.

FIG. 2 also illustrates a server resource computing device 34. The server resource computing device 34 can be utilized by one or more embodiments of the present disclosure. The server resource computing device 34 can be a computing device having a secondary memory containing weather-related information. The computing device 10 can communicate with the server resource computing device 34 and extract weather-related data and apply the extracted data in controlling the ball valve assembly 24. The server resource computing device 34 can be controlled by third parties, one example is a server of the Weather Channel®.

Figure 3:
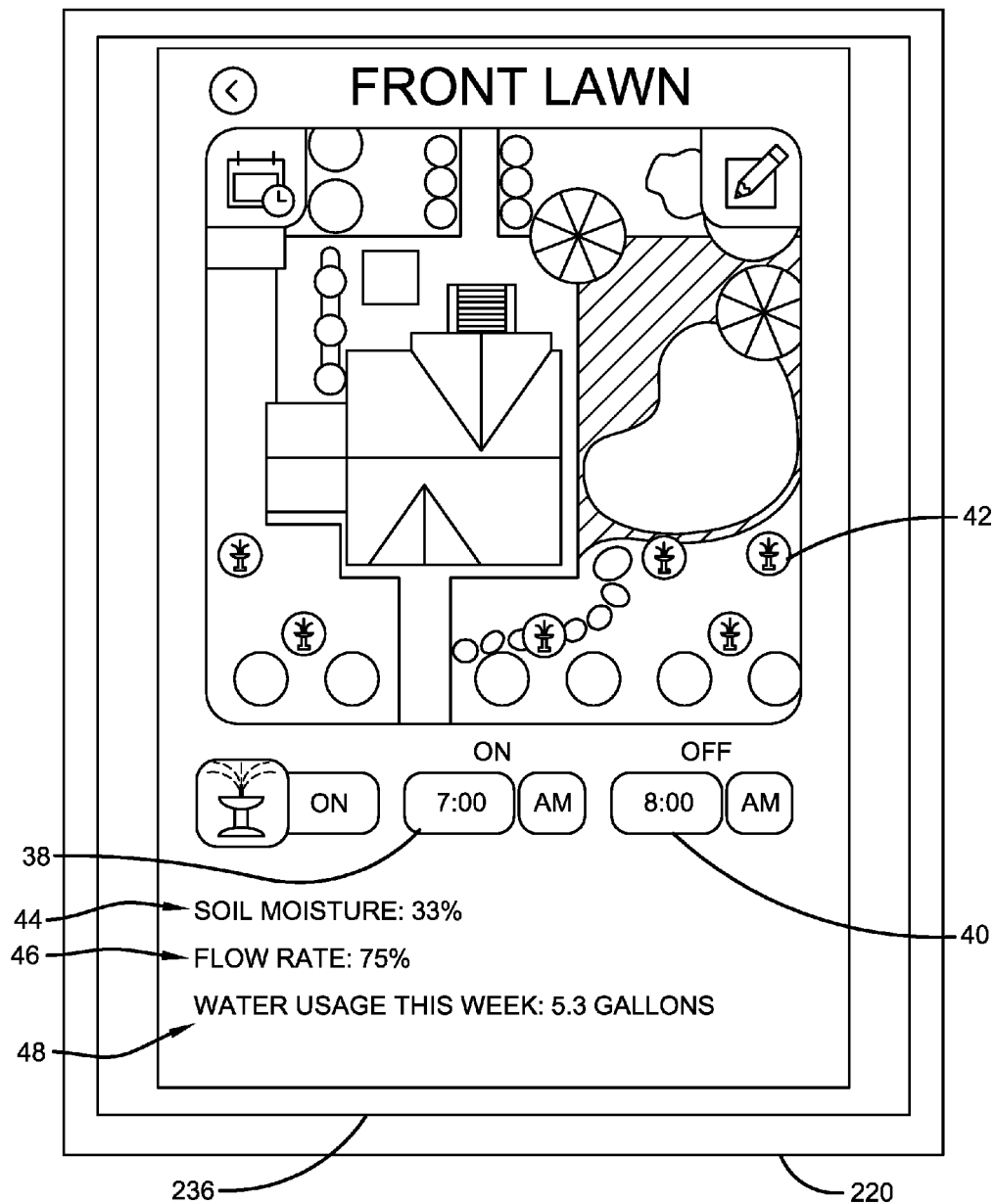
FIG. 3 is a first view of a display of the example flow control center of FIG. 1 displaying a user interface of a flow control center according to some implementations of the present disclosure.

FIG. 3 is a first view of a display of an example flow control center displaying a user interface of the flow control center application (app) according to some implementations of the present disclosure. The display 220 includes a portion 236 utilized by the flow control center app. The user interface of the flow control center app can receive a scheduling input from the user 12. The scheduling input is representative of an irrigation schedule. In FIG. 3, the scheduling input is defined by the user 12 using fields presented in the user interface. For example, the user 12 can enter the start time of water release at field 38 and the end time in field 40. The user 12 can tap the screen of the display 220 and be presented with a keyboard or pull-down menu to enter the times.

In embodiments having a plurality of ball valve assemblies, the scheduling input can also be defined by one or more location inputs from the user 12. A location input can be representative of a particular one of the plurality of ball valve assemblies. The area to be irrigated can be defined by a plurality of zones and one of the plurality of ball valve assemblies can be associated with each zone. The location input can represent a command by the user to activate the particular one of the plurality of ball valve assemblies. For example, the symbol referenced at 42 can be pressed by the user 12 to identify a particular valve for activation during the selected time period. The ball valve assemblies to be activated can be displayed in a different color than the ball valve assemblies that will remain disengaged. The scheduling input can also be defined by the desired flow rate of water, as referenced at 46.

Figure 7:
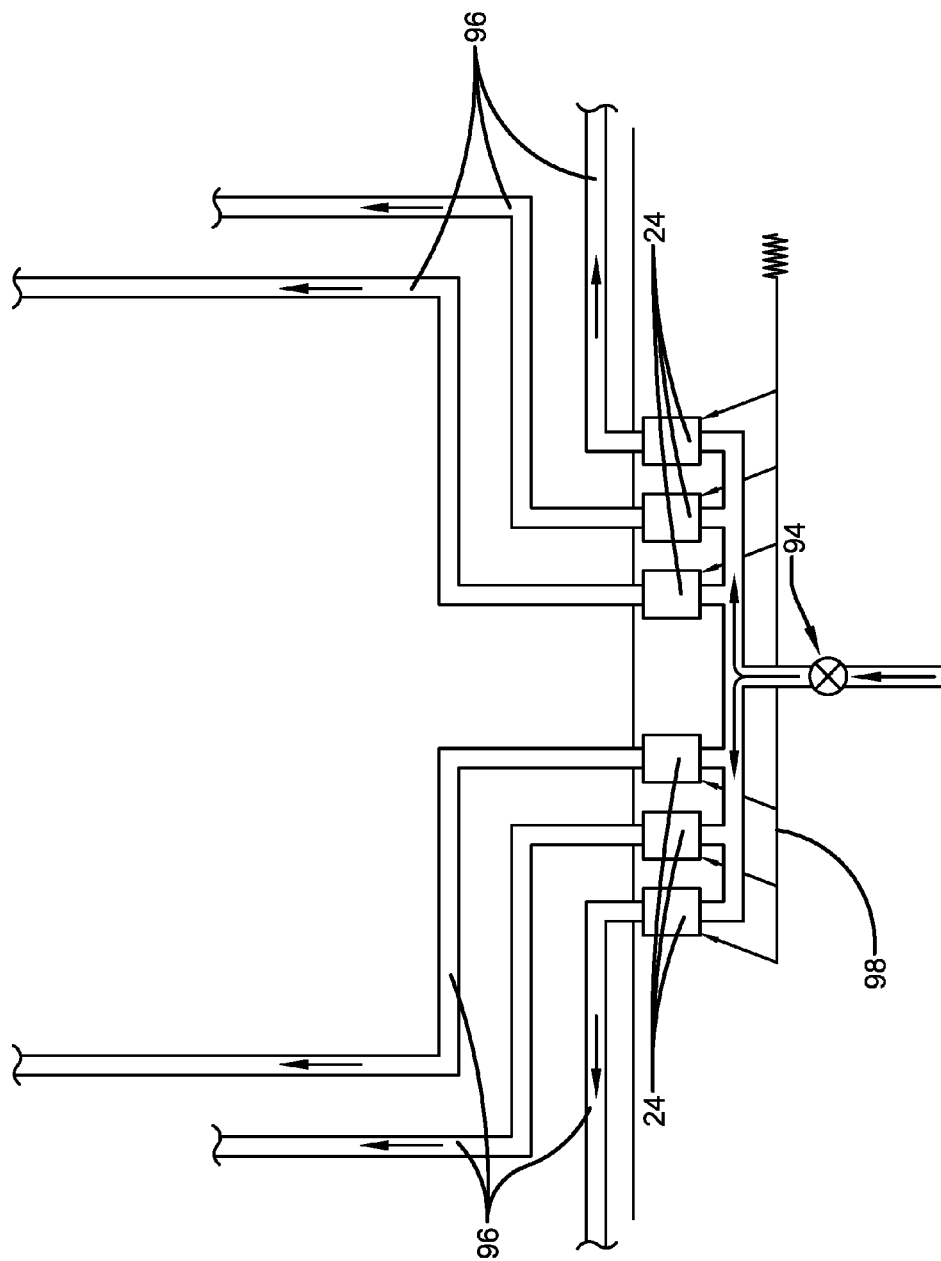
FIG. 7 is a schematic layout of a fluid distribution system of a flow control center according to some implementations of the present disclosure.

FIG. 7 is a schematic layout of a fluid distribution system of a flow control center according to some implementations of the present disclosure. FIG. 7 shows, schematically, an arrangement of a fluid distribution system for executing the fluid distribution offered to the user in FIG. 3. A main shut-off valve is referenced at 94. The valve 94 can be WI-FI enabled or operated by hand. Dedicated ball valves are referenced at 24 for each sub-section of the area to be irrigated. Each ball valve 24 can control flow through one of the respective conduits 96. A common connection to a power supply is referenced at 98.

The user interface can also display data defining current soil conditions such as moisture content, as referenced at 44. The flow control center 11 can determining an instantaneous amount of fluid passing through the ball valve assembly 24 with flow meter 28 and can also determine an aggregate amount of water used over a predetermined period of time. As referenced in FIG. 3 at 48, the flow control center app can output the sum to on the display 220.

Figure 4:
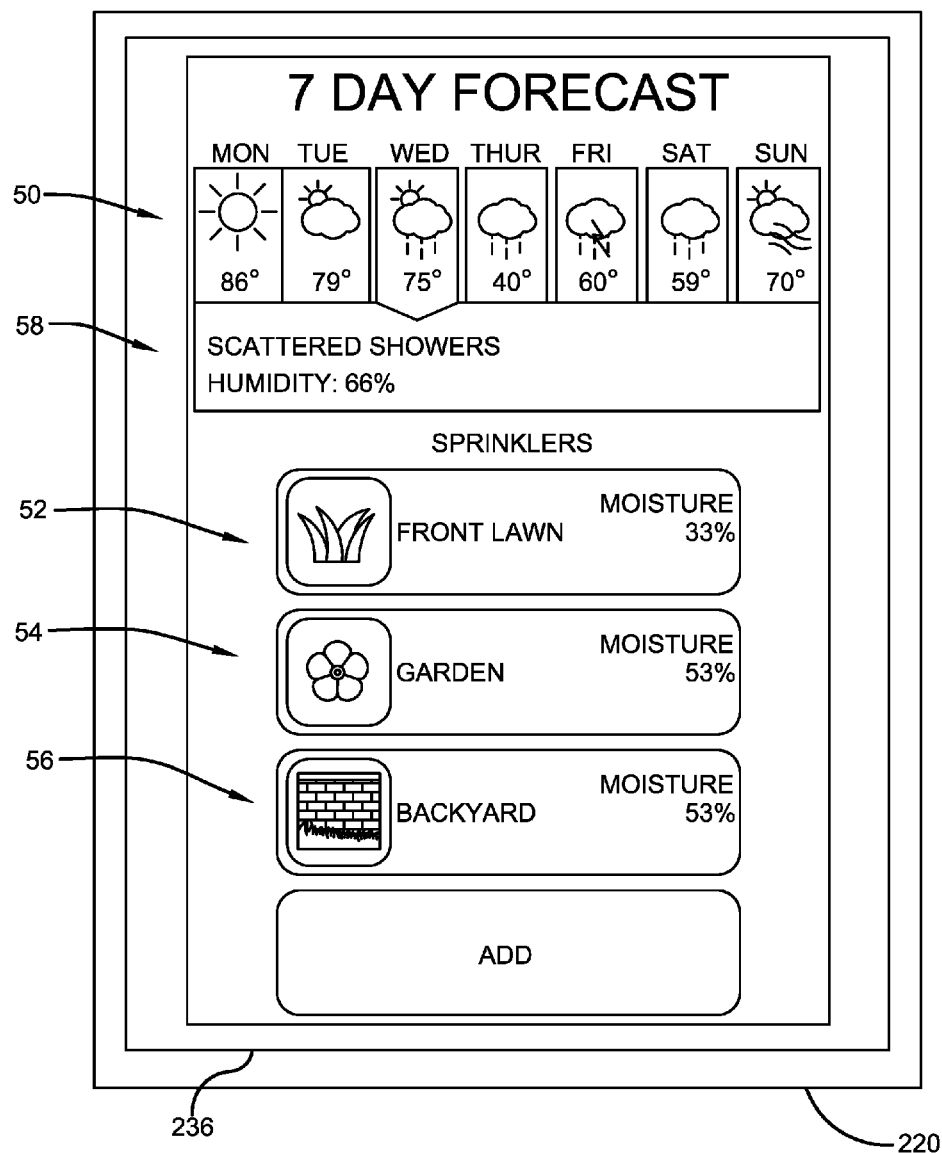
FIG. 4 is a second view of a display of the example flow control center of FIG. 1 displaying another user interface of a flow control center according to some implementations of the present disclosure.

FIG. 4 is a view of a second display (or screen shot) of an example flow control center displaying a user interface of the flow control center application (app) according to some implementations of the present disclosure. The user interface of the flow control center app can display current and long-term weather forecast data, as referenced at 50. The user interface of the flow control center app can display current soil conditions in various zones while no ball valve assemblies are open, as referenced at 52, 54 and 56. The flow control center 11 can also detect a first level of pressure in response to the first signal received by the barometric sensor 22 and output an alert to a user in response to the detected first level of pressure, as referenced at 58. The sensed conditions that prompt outputting an alert can also result in the flow control center 11 deviating from an irrigation schedule defined by a schedule input received from the user 12. Alerts can be sent via the user interface and/or can be sent outside of the user interface, such as by text or email.

The flow control center 11 can also be configured to execute a calibration function. The computing device 10 can detect a first level of moisture in soil in response to a first receipt of the third signal from the moisture sensor 28. The first level of moisture can be defined before irrigation starts. The computing device 10 can determine a first amount of fluid to permit through the ball valve assembly 24 in response to the first level of moisture in soil. The first amount of fluid can be determined based on a desired moisture level to be achieved. The computing device 10 can control the ball valve assembly 24 to release the first amount of fluid. The amount of fluid can be released based on opening the ball valve assembly 24 a greater extent for a shorter duration, or a lesser extent for a longer duration. The computing device 10 can later detect a second level of moisture in soil in response to a second receipt of the third signal. The computing device 10 can wait a second predetermined period of time after the fluid release so that the moisture content of the soil stabilizes. The second predetermined time can be one hour, one day, one week, or some other time period. The computing device 10 can comparing the first level of moisture in soil and the second level of moisture in soil. The algorithm applied in determining the first amount of fluid can be altered (calibrated) based on the comparison between the first level of moisture in soil and the second level of moisture in soil. For example, the algorithm can include coefficients or weighting variables or constants that are applied in a function with one or more sensed variables. These coefficients or weighting variables or constants can be variable in response to comparison between the first level of moisture in soil and the second level of moisture in soil.

Subsequent to the calibration, the computing device 10 can detect a third level of moisture in soil in response to a third receipt of the third signal. The third predetermined period of time can pass after the initial fluid release (of the first fluid amount) such that the moisture level has dropped below a predetermined level and water release is again desirable. The computing device 10 can determine a second amount of fluid to permit through the ball valve assembly 24 in response to the third level of moisture in soil and in response to the comparing. The calibration process can be repeated every time water is released or as desired.

Figure 5:
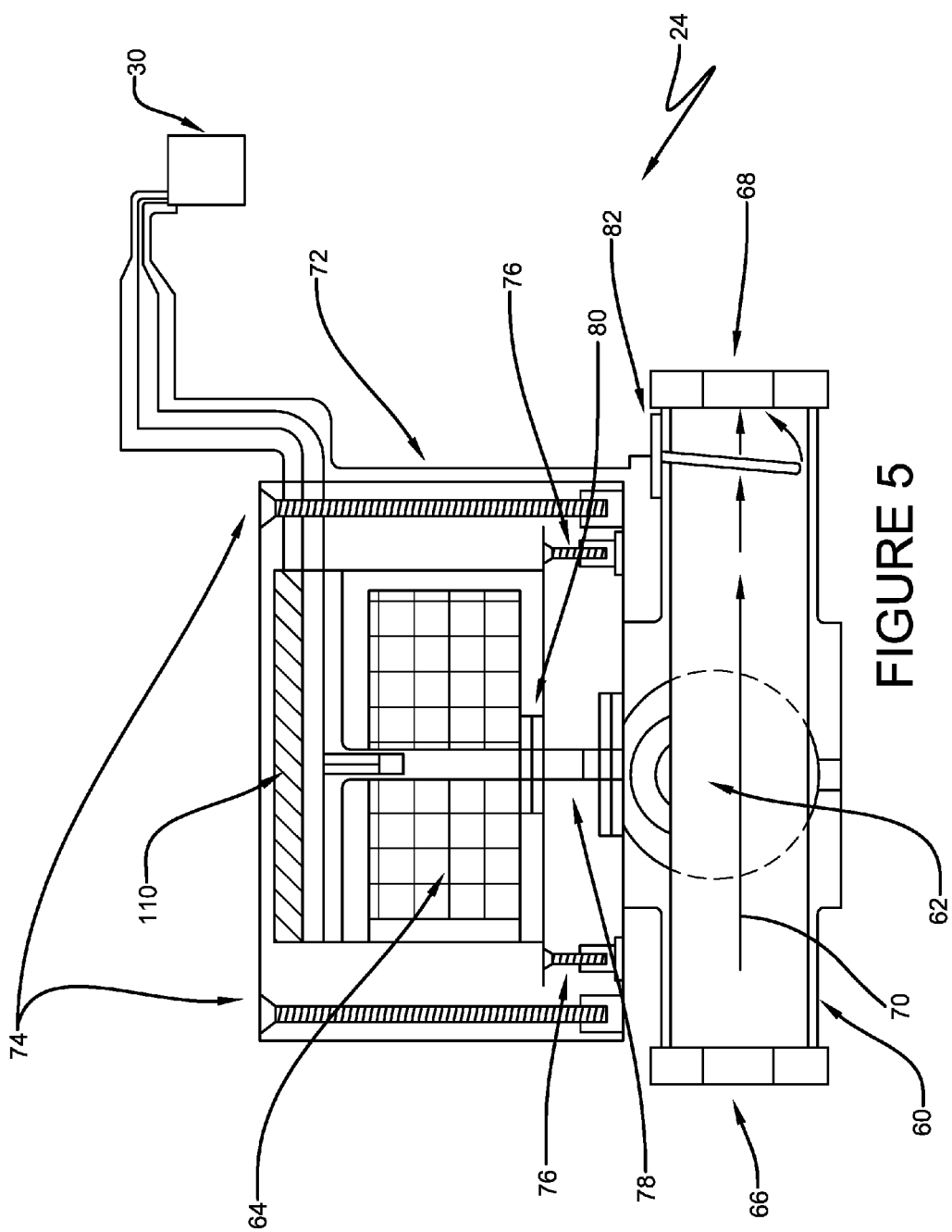
FIG. 5 is a cross-sectional view of a ball valve assembly of a flow control center according to some implementations of the present disclosure.

Referring now to FIG. 5, the ball valve assembly 24 can have a body 60, a ball valve 62 positioned in the body 60, and a motor 64 engaged with the ball valve 62. The body 60 can have an inlet 66 and an outlet 68. Fluid flow through the body is referenced at 70. The ball valve 62 is further defined as self-lubricating in the body 60. The ball valve 62 is further defined as formed from brass or stainless steel. The body 60 can be formed from metal or plastic.

The motor 64 can be positioned in a housing 72 formed from reinforced plastic. The housing 72 can be formed from multiple components held together by fasteners, such as fasteners 74. The motor 64 can be fixed to the housing 72 by fasteners, such as fasteners 76.

FIG. 5 also illustrates a WI-FI enabled flowrate sensor 82. The sensor 82 can be a paddle-type sensor. The signals generated by the sensor 82 can correspond to a rate of fluid flow through the body 60. The signals can be communicated to the computing device 110 or other computing devices, or both.

The battery 30 or some other source can be configured to power the motor 64. The motor 64 be interconnected with the ball valve 62 through shaft 78. One or more seals 80 can be positioned to seal the shaft 78 at the exit point from the housing 72 and the entry point of the body 60. The motor 64 could be connected to the grid for power.

The motor 64 can be configured to move the ball valve 62 among a plurality of discreet angular positions to selectively change a flow of fluid through the valve assembly. The plurality of discreet angular positions can include a first position in which the ball valve 62 closes the body 60 and a second position in which the ball valve 62 minimally blocks the body 60. The irrigation schedule described above represents one or more time periods in which the ball valve 62 assembly is to be positioned in one of the plurality of discreet angular positions except the first position.

Upon execution of the instructions, the computing device 110 can receive the first signal from the barometric sensor 22. The computing device 110 can determine a first flow rate in response to the sensed pressure represented by the first signal. The computing device can also control the motor 64 to move the ball valve 62 to a first of the plurality of discreet angular positions. The first of the plurality of discreet angular positions corresponding to the sensed pressure represented by the first signal. The output of water flow from the ball valve assembly 24 can be received by a sprinkler, a plurality of sprinklers, a network of bodies 60, or any other structure.

It is noted that the structures shown in FIG. 5 can all be positioned in a weatherproof or substantially weatherproof location. For example, the ball valve assembly 24 can be positioned in a shed, a garage, a crawl space, a building, a home, or any other enclosed structure. Positioning the ball valve assembly 24 in a weatherproof or substantially weatherproof location can enhance the life of the ball valve assembly 24.

Figure 6:
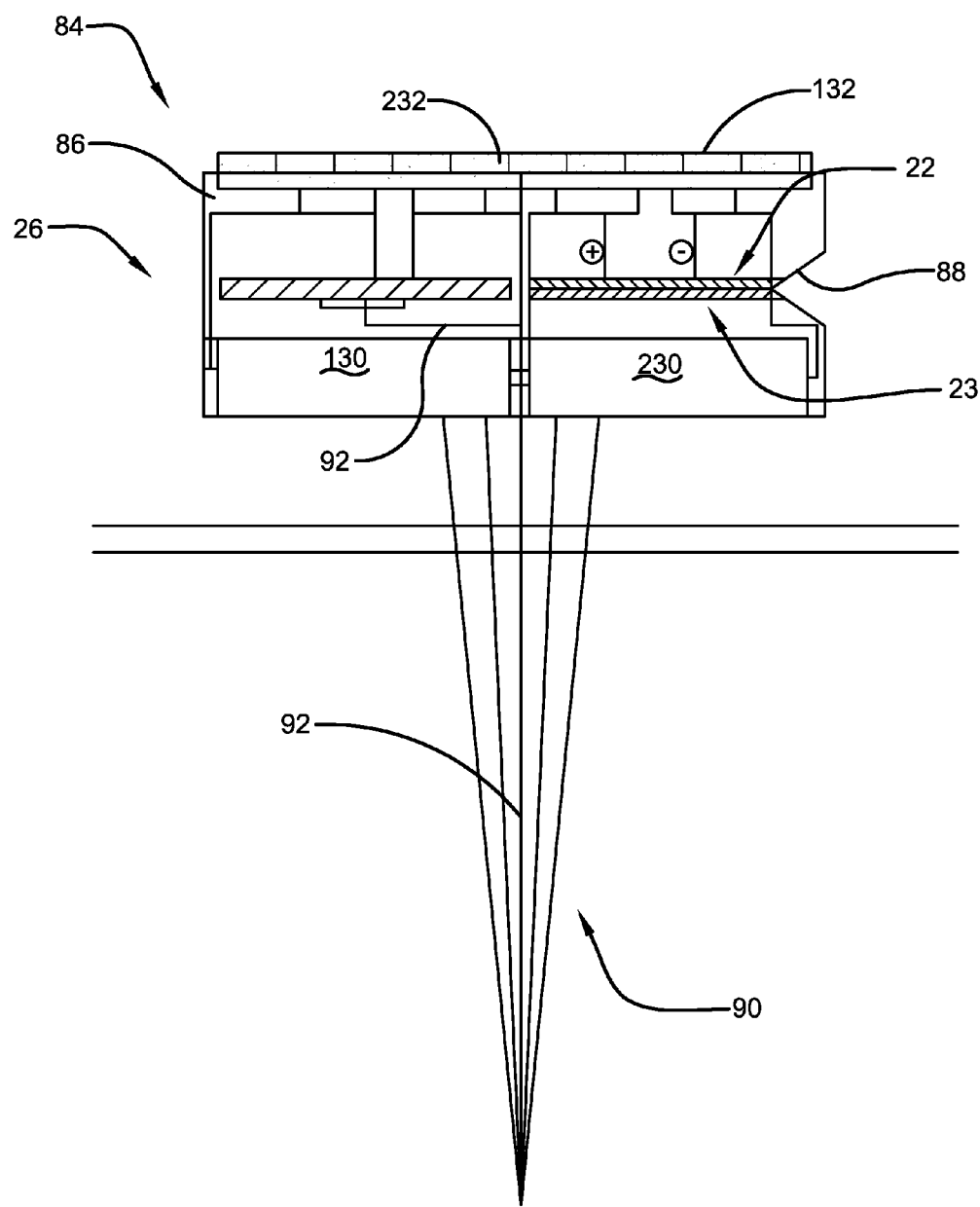
FIG. 6 is a cross-sectional view of a sensor assembly of a flow control center according to some implementations of the present disclosure.

FIG. 6 is a cross-sectional view of a sensor assembly 84 of a flow control center according to some implementations of the present disclosure. The sensor assembly 84 can incorporate the barometric sensor, the humidity sensor, and a soil moisture sensor, referenced at 22, 23 and 26. The barometric sensor 22 and the humidity sensor 23 can be positioned back-to-back in a housing 86 of the sensor assembly 84. The barometric sensor 22 and the soil moisture sensor 26 can be positioned side-by-side in a housing 86 of the sensor assembly 84. The barometric sensor 22 and the humidity sensor 23 can be powered by a battery 130, as well as a solar panel 132. The soil moisture sensor 26 can be powered by a battery 230, as well as a solar panel 232. The housing 86 can include an aperture 88 to receive air for the barometric sensor 22. The soil moisture sensor 26 can be configured to sense a level of soil moisture and emit a second signal corresponding to the level of soil moisture to a computing device, such as computing device 110. The sensor assembly 84 can also include a stake portion 90 extending from the housing 86 and drivable in the ground. A sensing wire 92 can extend from said soil moisture sensor 26 through the housing 86 and along the stake portion 90. The sensing wire 92 can extend to a transducer element positioned on the stake portion 90.

In one or more implementations of the present disclosure, initially, the moisture level sensor can detect the soil's moisture level (i.e. dry for example), triggering the valve motor to open the ball valve for the watering process to begin in a designated area. In the background, the barometric pressure sensor and the humidity sensor can be continuously active and monitoring ongoing and upcoming changing weather patterns. For example, significant barometric pressure drops indicate precipitation is soon approaching. Barometric pressure increases can indicate dryer, sunny weather conditions are approaching soon. This continual monitoring process allows the ball valve to determine its critical flow position or positions such as open/partially open/closed. In one approach that can be practiced in an embodiment of the present disclosure, the barometric pressure sensor acts as a monitoring and warning device. The collected data is then sent to the barometric receiver and then delivered to relative humidity receiver. Data collected from both sources will indicate the exact position of the ball valve at any given time.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved.

What is claimed is:

1. A flow control center comprising:
   a barometric sensor configured to sense pressure and emit a first signal corresponding to sensed pressure;
   at least one ball valve assembly having a body, a ball valve positioned in said body, a motor engaged with said ball valve and configured to move said ball valve among a plurality of discreet angular positions to selectively change a flow of fluid through said valve assembly including a first position in which said ball valve closes said body and a second position in which said ball valve minimally blocks said body;
   a computing device having:
      a communication device configured to receive the first signal from said barometric sensor,
      one or more processors, and
      a non-transitory, computer readable medium storing instructions that, when executed by the one or more processors, cause the computing device to perform operations comprising:
         receiving the first signal from said barometric sensor,
         determining a first flow rate in response to the sensed pressure represented by the first signal, and
         controlling said motor to move said ball valve to a first of said plurality of discreet angular positions, said first of said plurality of discreet angular positions corresponding to the sensed pressure represented by the first signal;
   wherein said ball valve assembly is further defined as a plurality of ball valve assemblies and wherein said computing device is further defined as having at least one processor mounted on each one of said plurality of ball valve assemblies; and
   wherein said non-transitory, computer readable medium storing instructions further causes the computing device to perform an operation comprising:
      receiving a location input from a user, the location input representative of a particular one of said plurality of ball valve assemblies, the location input representing a command by the user to activate said particular one of said plurality of ball valve assemblies; and
      controlling said motor of said particular one of said plurality of ball valve assemblies in response to the location input.

2. The flow control center of claim 1 wherein said ball valve is further defined as self-lubricating in said body.

3. The flow control center of claim 1 further comprising:
   a sensor assembly incorporating said barometric sensor and a soil moisture sensor, said barometric sensor and said soil moisture sensor positioned side-by-side in a housing of said sensor assembly, said soil moisture sensor configured to sense a level of soil moisture and emit a second signal corresponding to the level of soil moisture to said computing device, said sensor assembly including a stake portion extending from said housing and drivable in the ground, a sensing wire extending from said soil moisture sensor through said housing and along said stake portion.

4. The flow control center of claim 3 wherein said sensor assembly further comprises a humidity sensor positioned back-to-back with respect to the barometric sensor.

5. The flow control center of claim 1 further comprising:
   a battery configured to power said motor.

6. The flow control center of claim 5 wherein said battery is further defined as configured to power said computing device.

7. The flow control center of claim 6 further comprising:
a solar panel configured to generate electric current and in electrical communication with said battery to deliver the electrical current to recharge said battery.

8. The flow control center of claim 1 wherein said computing device is further defined as including a server computing device.

9. The flow control center of claim 8 wherein said computing device is further defined as including a mobile computing device.

10. The flow control center of claim 9 wherein at least one of said one or more processors is physically remote from said server computing device and said mobile computing device and physically proximate to said ball valve.

11. The flow control center of claim 1 further comprising:
a flow meter configured to sense a rate of fluid flow through said body and emit a second signal corresponding to sensed rate of fluid flow.

12. The flow control center of claim 11 wherein said non-transitory, computer readable medium storing instructions further causes the computing device to perform an operation comprising:
determining an instantaneous amount of fluid passing through said body;
determining a sum of a plurality of instantaneous amounts of fluid passing through said body over a predetermined period of time; and
outputting the sum to a display.

13. The flow control center of claim 1 further comprising:
a soil moisture sensor configured to sense a level of moisture in soil and emit a third signal corresponding to sensed level of moisture in soil.

14. The flow control center of claim 13 wherein said non-transitory, computer readable medium storing instructions further causes the computing device to perform an operation comprising:
detecting a first level of moisture in soil in response to a first receipt of the third signal;
determining a first amount of fluid to permit through said body in response to the first level of moisture in soil;
controlling said motor to move said ball valve to a first of said plurality of discreet angular positions except said first position for a first predetermined period of time to release the first amount of fluid;
detecting a second level of moisture in soil in response to a second receipt of the third signal a second predetermined period of time after said controlling said motor to move said ball valve to said first of said plurality of discreet angular positions for the first predetermined period of time to release the first amount of fluid; and
comparing the first level of moisture in soil and the second level of moisture in soil.

15. The flow control center of claim 14 wherein said non-transitory, computer readable medium storing instructions further causes the computing device to perform an operation comprising:
detecting a third level of moisture in soil in response to a third receipt of the third signal a third predetermined period of time after said comparing;
determining a second amount of fluid to permit through said body in response to the third level of moisture in soil and in response to said comparing.

16. The flow control center of claim 1 wherein said non-transitory, computer readable medium storing instructions further causes the computing device to perform an operation comprising:
receiving a scheduling input from a user, the scheduling input representative of an irrigation schedule, the irrigation schedule representing one or more time periods in which said ball valve is to be positioned in one of said plurality of discreet angular positions except said first position; and
controlling said motor in response to the scheduling input.

17. The flow control center of claim 1 wherein said non-transitory, computer readable medium storing instructions further causes the computing device to perform an operation comprising:
retrieving first data from a secondary memory physically remote from the computing device through a network.

18. The flow control center of claim 17 wherein said non-transitory, computer readable medium storing instructions further causes the computing device to perform an operation comprising:
controlling said motor in response to the retrieved first data.

* * * * *